(12) United States Patent
Teshima

(10) Patent No.: US 9,743,740 B2
(45) Date of Patent: Aug. 29, 2017

(54) DRAWING APPARATUS AND DRAWING METHOD FOR DRAWING APPARATUS

(71) Applicant: CASIO COMPUTER CO., LTD., Shibuya-ku, Tokyo (JP)

(72) Inventor: Yoshihiro Teshima, Higashimurayama (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/189,820

(22) Filed: Jun. 22, 2016

(65) Prior Publication Data

US 2017/0000235 A1 Jan. 5, 2017

(30) Foreign Application Priority Data

Jun. 30, 2015 (JP) ................................. 2015-130630

(51) Int. Cl.
| | |
|---|---|
| *G06K 15/22* | (2006.01) |
| *A45D 29/00* | (2006.01) |
| *A45D 34/04* | (2006.01) |
| *G06K 9/46* | (2006.01) |
| *G06T 7/73* | (2017.01) |
| *G06T 7/11* | (2017.01) |
| *G06T 7/13* | (2017.01) |
| *A45D 20/12* | (2006.01) |

(52) U.S. Cl.
CPC ............ *A45D 29/00* (2013.01); *A45D 34/04* (2013.01); *G06K 9/4642* (2013.01); *G06T 7/11* (2017.01); *G06T 7/13* (2017.01); *G06T 7/73* (2017.01); *A45D 2020/128* (2013.01); *A45D 2029/005* (2013.01)

(58) Field of Classification Search
None
See application file for complete search history.

(56) References Cited

U.S. PATENT DOCUMENTS

| | | | |
|---|---|---|---|
| 6,286,517 B1 * | 9/2001 | Weber ................... | A45D 29/00 132/200 |
| 2012/0287192 A1 * | 11/2012 | Yamasaki ............. | B41J 3/4073 347/14 |

(Continued)

FOREIGN PATENT DOCUMENTS

JP 2003534083 A 11/2003

*Primary Examiner* — Ted Barnes
(74) *Attorney, Agent, or Firm* — Holtz, Holtz & Volek PC

(57) ABSTRACT

A drawing apparatus is provided with a drawing unit which applies a drawing on a nail of a subject which is a finger or a toe; and a control unit which controls operation of the drawing unit.
The control unit extracts a first feature part in a first area which is inside area of a first subject outline of the subject in a first subject image acquired by imaging the subject after a first drawing has been applied on the nail, acquires a position of the nail in the first subject image on the basis of the first feature part and a second feature part which is extracted in a second area which is inside area of a second subject outline of a second subject image except an area of the nail, the second subject image is acquired by imaging the subject which the drawing has not been applied; and controls a drawing position of the drawing unit when the drawing unit applies a second drawing on the nail after the first subject image is acquired, on the basis of the position of the nail in the first subject image.

15 Claims, 8 Drawing Sheets

(56) References Cited

U.S. PATENT DOCUMENTS

| | | | | |
|---|---|---|---|---|
| 2013/0038648 A1* | 2/2013 | Kasahara | ............... | B41J 3/407 347/2 |
| 2014/0060560 A1* | 3/2014 | Bitoh | ................. | A45D 29/00 132/73 |
| 2014/0267517 A1* | 9/2014 | Yamasaki | ............. | B41J 3/4073 347/101 |
| 2015/0007841 A1* | 1/2015 | Yamasaki | ............. | A45D 29/00 132/73.5 |
| 2015/0128981 A1* | 5/2015 | Asako | ................. | A45D 29/00 132/200 |
| 2015/0138264 A1* | 5/2015 | Yamasaki | ............... | B41J 3/407 347/9 |

* cited by examiner

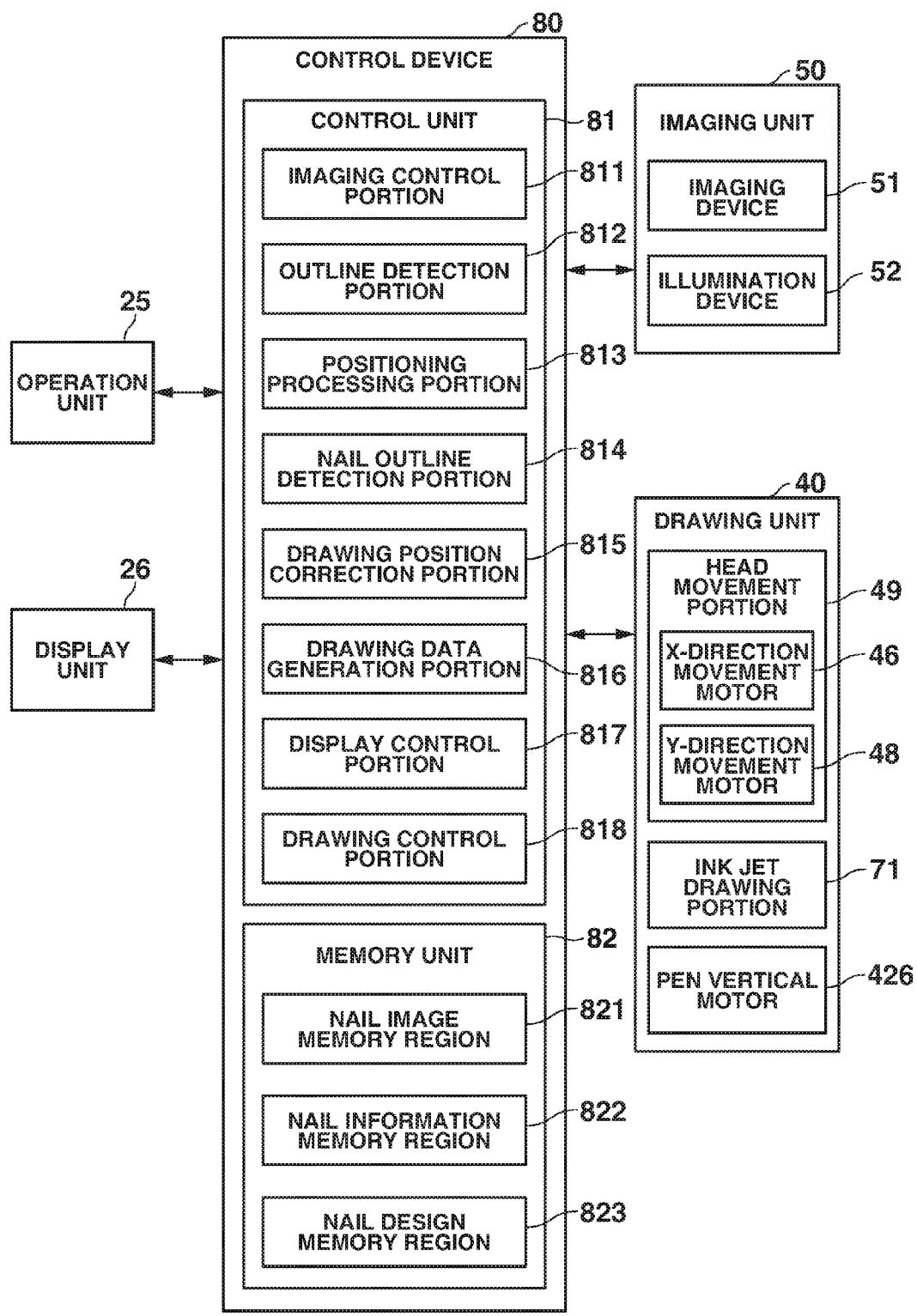

DRAWING APPARATUS AND DRAWING METHOD FOR DRAWING APPARATUS

CROSS-REFERENCE TO RELATED APPLICATIONS

The present invention contains subject matter related to Japanese Patent Application No. 2015-130630 filed in the Japanese Patent Office on Jun. 30, 2015, the entire contents of which are incorporated herein by reference.

BACKGROUND OF THE INVENTION

1. Field of the Invention

The present invention relates to a drawing apparatus and a drawing method for a drawing apparatus.

2. Description of the Related Art

Conventionally, nail printing apparatuses for printing desired nail designs on nails of human fingers are known. An example of such a nail printing apparatus is described in Japanese Unexamined Patent Application Publication (Translation of PCT Application) No. 2003-534083.

Nail printing can be enjoyed readily without the need to visit a nail salon or the like by using such an apparatus.

However, in cases where conducting printing of a nail design using a plurality of colors of ink, there are cases where a step of performing drawing with one color of ink and then allowing the applied ink to dry is repeated a plurality of times for each color of ink. In this case, positions of a drawing subject, namely a nail, may become mutually displaced each time performing the drawing using each color of ink.

If the drawing is performed while the position of the nail is displaced, problems may occur such as the drawing position of the design on the nail becoming displaced, each of the colors being applied at overlapping positions, and the like. Thus, there have been cases where performing drawing of high quality has been difficult.

BRIEF SUMMARY OF THE INVENTION

The present invention is advantageous in that a drawing apparatus and a drawing method for a drawing apparatus can be provided whereby, in cases where dividing drawing of a nail design on a nail into a plurality of drawing instances, even in cases where a position of the nail moves between an ending of one instance of drawing and a beginning of a subsequent instance of drawing, displacement of the drawing position on the nail from a legitimate position can be prevented and drawing of high quality can be performed.

According to an embodiment of the present invention, there is provided a drawing apparatus including a drawing unit which applies a drawing on a nail of a subject which is a finger or a toe; and a control unit which controls operation of the drawing unit; wherein the control unit: (1) extracts a first feature part in a first area which is inside area of a first subject outline of the subject in a first subject image acquired by imaging the subject after a first drawing has been applied on the nail, (2) acquires a position of the nail in the first subject image on the basis of the first feature part and a second feature part which is extracted in a second area which is inside area of a second subject outline of a second subject image except an area of the nail, the second subject image is acquired by imaging the subject which the drawing has not been applied; and (3) controls a drawing position of the drawing unit when the drawing unit applies a second drawing on the nail after the first subject image is acquired, on the basis of the position of the nail in the first subject image.

According to another embodiment of the present invention, there is provided a drawing method for a drawing apparatus, the drawing apparatus comprising: a drawing unit which applies a drawing on a nail of a subject which is a finger or a toe; the drawing method comprising the steps of: extracting a first feature part in a first area which is inside area of a first subject outline of the subject in a first subject image acquired by imaging the subject after a first drawing has been applied on the nail; acquiring a position of the nail in the first subject image on the basis of the first feature part and a second feature part which is extracted in a second area which is inside area of a second subject outline of a second subject image except an area of the nail, the second subject image is acquired by imaging the subject which the drawing has not been applied; and controlling a drawing position of the drawing unit, when the drawing unit applies a second drawing on the nail after the first subject image is acquired, on the basis of the position of the nail in the first subject image.

BRIEF DESCRIPTION OF THE SEVERAL VIEWS OF THE DRAWING

FIG. 4 is a main constituent block diagram showing a control configuration of the drawing apparatus according to the embodiment of the present invention.

DETAILED DESCRIPTION OF THE INVENTION

Figure 1A:
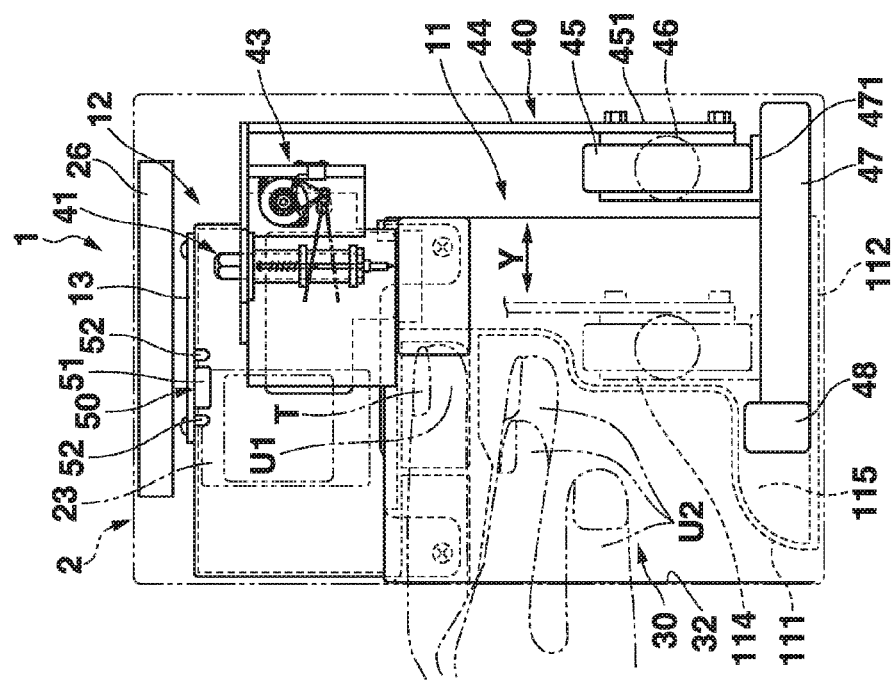
FIG. 1A is a front view of a drawing apparatus according to an embodiment of the present invention.

Embodiments of the nail printing apparatus (drawing apparatus) and drawing method for the nail printing apparatus (drawing apparatus) according to the present invention are described below in detail while referring to the drawings.

While various limitations, which are technically preferable from the perspective of carrying out the present invention, are placed on the embodiments described below, the scope of the present invention should not be construed to be limited to these embodiments or the examples illustrated in the drawings.

In the following embodiments, a nail printing apparatus 1 will be described as an apparatus for drawing on a drawing subject surface, namely the surface of a fingernail. However, the drawing subject surface of the present invention is not limited to the surface of a fingernail and, for example, may be the surface of a toenail.

Figure 1B:
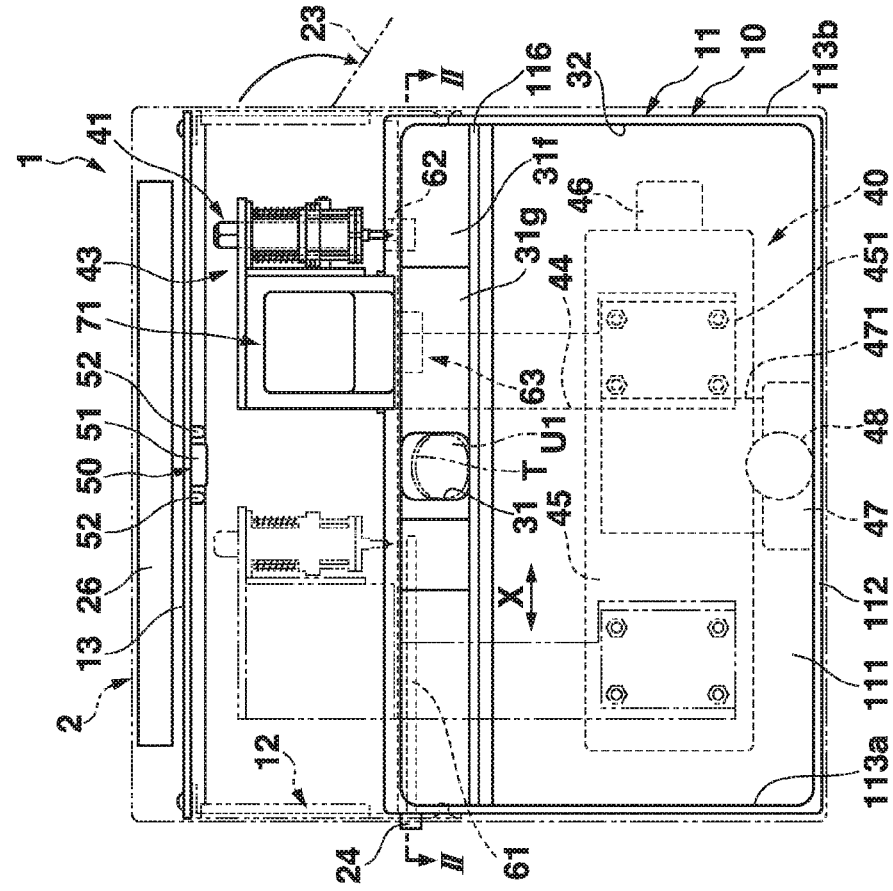
FIG. 1B is a side view illustrating an internal configuration of the drawing apparatus depicted in FIG. 1A.

FIG. 1A is a front view of a nail printing apparatus, illustrating an internal configuration of the nail printing apparatus. FIG. 1B is a side view illustrating the internal configuration of the nail printing apparatus depicted in FIG. 1A.

Figure 2:
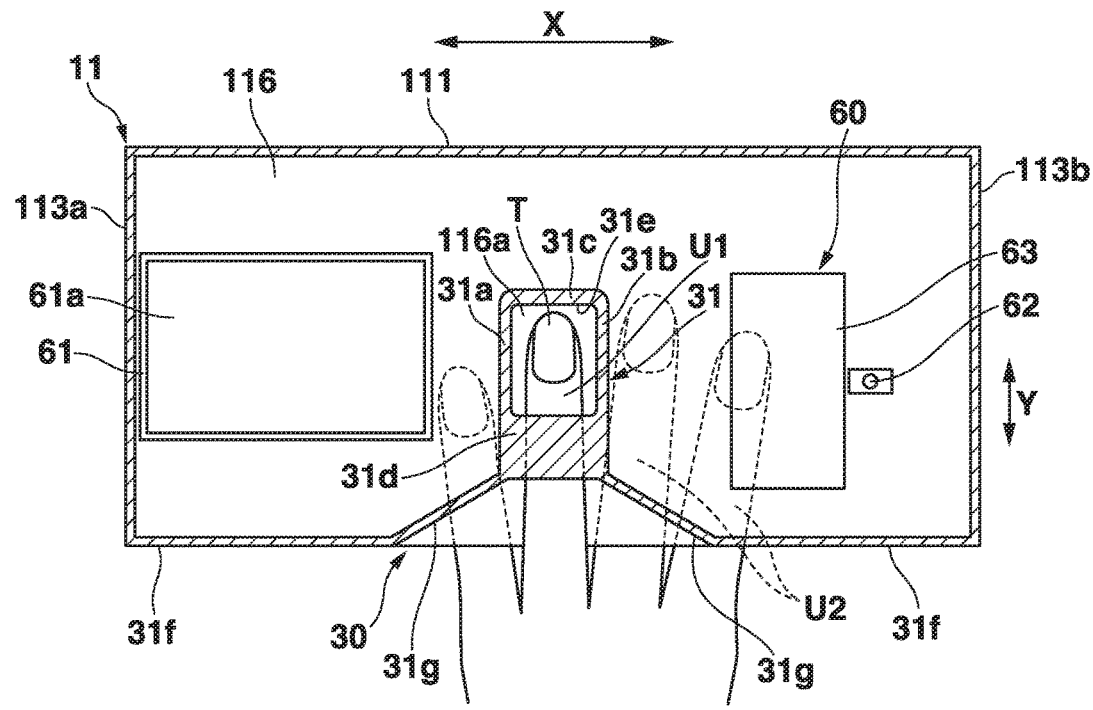
FIG. 2 is a cross-sectional view taken along line II-II of FIG. 1A.

FIG. 2 is a cross-sectional view taken along line II-II of FIG. 1A.

As illustrated in FIGS. 1A and 1B, in the nail printing apparatus 1 of the present embodiment, a drawing head 43 is provided with drawing tools, namely a pen 41 and an ink jet drawing portion 71. The nail printing apparatus 1 of the present embodiment uses plotter printing and ink jet printing to apply a drawing on a nail T of a print finger U1.

The nail printing apparatus 1 is provided with a case body 2 and an apparatus main body 10 housed in the case body 2.

A cover 23, configured to be openable and closeable, for replacing the pen 41 and the ink jet drawing portion 71 of the hereinafter described drawing unit 40 is provided in an edge of an upper portion of a side surface of the case body 2.

The cover 23 is rotatable via, for example, a hinge or the like, from a closed state to an open state, as illustrated in FIG. 1A.

An operation unit 25 (see FIG. 4) is set on an upper surface (top panel) of the case body 2.

The operation unit 25 is an input unit where a user performs various types of input.

Operation buttons (not illustrated in the drawings) for performing various types of input are set in the operation unit 25. Examples of the operation buttons include a power switch button for turning on the power of the nail printing apparatus 1, a stop switch button for stopping operation, a design selection button for selecting a design image to be drawn on the nail T, a drawing start button for commanding the drawing to start, and the like.

A display unit 26 is set approximately in a center portion of the top surface (top panel) of the case body 2.

The display unit 26 is configured from, for example, a liquid crystal display (LCD), an organic electroluminescence display, or other type of flat display.

In the present embodiment, examples of images appropriately displayed on the display unit 26 include finger images obtained by imaging the print finger U1 (images of the print finger U1 including images of the nail T), images of the outline or the like of the nail T included in the finger images, design selection images for selecting a design image to be drawn on the nail T, thumbnail images for design confirmation, command screens displaying various commands, and the like.

Note that a configuration is possible in which a touch panel for performing various types of input is integrated into the surface of the display unit 26.

The apparatus main body 10 is formed into a rough box-shape and is provided with a lower frame 11 set in the lower portion of the interior of the case body 2, and an upper frame 12 set above the lower frame 11 and in the upper portion of the interior of the case body 2.

First, the lower frame 11 will be described.

The lower frame 11 has a back surface plate 111, a bottom plate 112, a pair of left and right side plates 113a and 113b, an X-direction movement stage housing 114, a Y-direction movement stage housing 115, and a dividing wall 116.

Bottom edges of the side plates 113a and 113b are joined respectively to left and right edges of the bottom plate 112. The side plates 113a and 113b are provided in an upright state on the bottom plate 112.

A lower portion of the back surface plate 111 is formed so as to sink forward (toward the finger insertion direction proximal side) in two stages. The bottom edge of the back surface plate 111 is joined to a front edge of the bottom plate 112. The back surface plate 111 divides the area surrounded by the bottom plate 112 and the side plates 113a and 113b into front and back.

The space formed on the back side of the sunken back surface plate 111 becomes the X-direction movement stage housing 114 and the Y-direction movement stage housing 115 (see FIG. 1B).

An X-direction movement stage 45 of the drawing unit 40 is housed in the X-direction movement stage housing 114 when the drawing unit 40 is moved forward (toward the finger insertion direction proximal side).

A Y-direction movement stage 47 of the drawing unit 40 is disposed in the Y-direction movement stage housing 115.

The dividing wall 116 is provided inside the lower frame 11 so as to vertically divide the space on the front side inside the lower frame 11 (the space on the finger insertion direction proximal side surrounded by the back surface plate 111, the bottom plate 112, and the side plates 113a and 113b).

The dividing wall 116 is provided roughly horizontally, left and right edges of the dividing wall 116 are joined respectively to the side plates 113a and 113b, and a back edge of the dividing wall 116 is joined to the back surface plate 111.

A finger securing portion 30 (see FIG. 1B) is provided integrally in the lower frame 11.

The finger securing portion 30 is configured from a finger receiving portion 31 for receiving the finger corresponding to the nail T on which drawing will be applied (hereinafter referred to as "print finger U1"), and a finger clearing portion 32 for clearing fingers other than the print finger U1 (hereinafter referred to as "non-print fingers U2").

The finger receiving portion 31 is disposed on an upper side of the dividing wall 116 and roughly in a center portion in a width direction of the lower frame 11.

The space on the lower side of the lower frame 11, partitioned by the dividing wall 116, forms the finger clearing portion 32.

For example, in cases where applying a drawing on the nail T of a ring finger, the ring finger is inserted into the finger receiving portion 31 as the print finger U1, and the non-print fingers U2, namely the other four fingers (thumb, index finger, middle finger, and little finger) are inserted into the finger clearing portion 32.

As illustrated in FIGS. 1B and 2, the finger receiving portion 31 is open to a front surface side of the lower frame 11 (print finger insertion direction proximal side); and a bottom side is defined by a finger mount portion 116a that constitutes a portion of the dividing wall 116, sides are defined by partitions 31a and 31b, and a rear side is defined by a partition 31c.

The finger mount portion 116a is a constituent where the finger (the print finger U1) of the nail T on which drawing is to be applied is mounted on the X-Y plane.

Note that in the present embodiment, as described hereinafter, in order to perform imaging of the print finger U1 with the finger mount portion 116a as the background and detect a finger area of the print finger U1 from a difference in the color, brightness, or the like with the finger mount portion 116a as the background, the finger mount portion 116a preferably has a color that is easily differentiated from the print finger U1 in image processing, and the color is preferably blue, black, or the like, which is an inverted color of a skin color.

A top side of the finger receiving portion 31 is defined by a ceiling portion 31d. A window 31e is formed in the ceiling portion 31d for exposing the nail T of the print finger U1 inserted into the finger receiving portion 31.

A front wall 31f (see FIG. 1A) that closes the front surface side of the lower frame 11 is provided on the top surface of the dividing wall 116, at both end portions on the front surface side of the lower frame 11.

A pair of guide walls 31g (see FIG. 1A) that guides the print finger U1 into the finger receiving portion 31 is erected on the top surface of the dividing wall 116, and the pair of guide walls 31g narrows from the end of the front wall 31f on the center portion side toward the finger receiving portion 31.

A user can pinch the dividing wall 116 between the print finger U1 inserted into the finger receiving portion 31 and the non-print fingers U2 inserted into the finger clearing portion 32. Thus, the print finger U1 inserted into the finger receiving portion 31 is stably secured.

A warm-up drawing portion 61 is provided on the top surface of the lower frame 11, beside the finger receiving portion 31 (location corresponding to a media access port 24 of the case body 2, on the left side in FIGS. 1A and 2). The warm-up drawing portion 61 (described hereinafter) is for performing warm-up drawing to eliminate fading and the like at a time of beginning of drawing by a pen tip (tip portion) 413 of the pen 41 within a drawable area of the drawing head 43 (described hereinafter).

The warm-up drawing portion 61 is a flat portion and is configured so that drawing media 61a inserted through the media access port 24 of the case body 2 is mounted thereon.

The drawing media 61a mounted on the warm-up drawing portion 61 is not limited, provided that warm-up drawing of the pen tip (tip portion) 413 can be performed, and for example, may be a piece of paper.

A home area 60 where the drawing head 43 stands by at times when not drawing is provided on the top surface of the lower frame 11, beside the finger receiving portion 31 (in the present embodiment, the right side in FIGS. 1A and 2), within a movable range of the drawing head 43 described hereinafter.

A number of pen caps 62 (in the present embodiment, one) exactly corresponding to the pen holder 42 described hereinafter are set in the home area 60.

An ink jet maintenance portion 63 is provided within the home area 60, at a position corresponding to a position where the ink jet drawing portion 71 is disposed when the pen tip 413 is stored in the pen cap 62.

The ink jet maintenance portion 63 is configured from, for example, a cleaning mechanism for cleaning an ink discharging portion (nozzle surface) of the ink jet drawing portion 71 described hereinafter, a cap mechanism for maintaining moist conditions of the ink discharging portion (nozzle surface), and the like (all not illustrated in the drawings).

Note that the disposal of the pen cap 62, the ink jet maintenance portion 63, and the like in the home area is not limited to the examples described herein.

The drawing unit 40 is configured from and provided with the drawing head 43, a unit supporting member 44 that supports the drawing head 43, the X-direction movement stage 45 for moving the drawing head 43 in the X direction (the X direction in FIGS. 1A and 2; the left-right direction of the drawing apparatus 1), an X-direction movement motor 46, the Y-direction movement stage 47 for moving the drawing head 43 in the Y direction (the Y direction in FIGS. 1B and 2; the front-back direction of the drawing apparatus 1), a Y-direction movement motor 48, and the like.

Figure 3A:
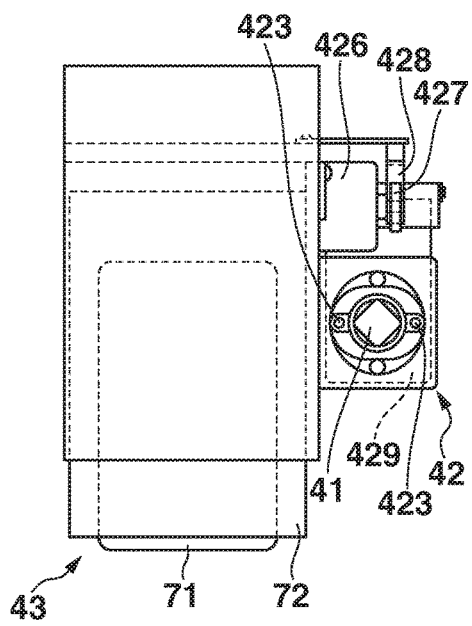
FIG. 3A is a top view of a drawing head according to the embodiment of the present invention.
Figure 3B:
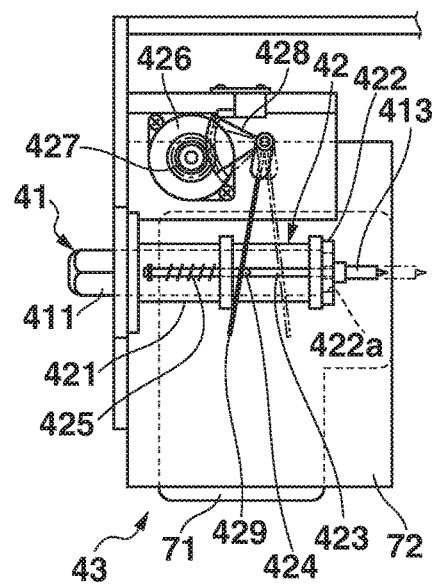
FIG. 3B is a side view of the drawing head according to the embodiment of the present invention.

FIG. 3A is a top view of a drawing head and FIG. 3B is a side view of the drawing head according to the present embodiment.

As illustrated in FIGS. 3A and 3B, in a drawing head 43 of the present embodiment, the pen holder 42 holding the pen 41 and an ink jet holder 72 holding the ink jet drawing portion 71 are disposed adjacently to each other.

The ink jet drawing portion 71 is, for example, an ink cartridge-integrated head in which ink cartridges (not illustrated in the drawings) corresponding to yellow (Y), magenta (M), and cyan (C) ink are formed integrally with an ink discharging portion (not illustrated in the drawings) provided on a surface (in the present embodiment, the bottom surface in FIG. 1A and the like) facing the drawing subject (the nail T) in each of the ink cartridges.

The ink discharging portion is provided with a nozzle array consisting of a plurality of nozzles for spraying each color of ink. The ink jet drawing portion 71 micronizes the ink and performs the drawing by spraying the ink from the ink discharging portion directly on the target drawing surface of the drawing subject (the nail T).

Note that the ink jet drawing portion 71 is not limited to those that discharge the three colors of ink described previously. Ink cartridges holding other ink and ink discharging portions may also be provided.

One of the pen 41 is mountable in the pen holder 42 of the present embodiment.

The pen 41 is a writing utensil that has the surface of the nail T as its drawing subject surface, and applies a drawing by the tip portion thereof being brought into contact with the drawing subject surface, namely the surface of the nail T.

As illustrated in FIG. 3B and the like, the pen 41 is provided with the pen tip 413 on a tip side of a rod-like pen shaft portion 411 (see FIG. 3B).

An interior of the pen shaft portion 411 is an ink storing portion for storing various types of ink.

Any type of ink can be stored in the interior of the pen shaft portion 411. Viscosity of ink, diameter of the coloring particles (particle size), and the like are not particularly limited and, for example, ink containing metallic glitter, white ink, UV-curable ink, ink for gel nails, ink for under coats, ink for top coats, nail varnish, and the like can be used.

In the present embodiment, the pen 41 is a ballpoint pen in which the pen tip 413 draws by the ink stored in the pen shaft portion 411 being dispensed by pressing the pen tip 413 against the surface of the nail T.

Note that the pen 41 is not limited to a ballpoint pen. For example, the pen 41 may be a felt-tip pen that draws by soaking ink into a felt-like pen tip, a brush pen that draws by soaking ink into a bundle of hairs, or the like.

The pen 41 having the pen tip 413 of any desired thickness may be provided as well.

Each of a plurality of the pens 41 is replaced and mounted in the pen holder 42. Each of the plurality of pens 41 that is replaced and set in the pen holder 42 may be pens that all have the same type of the pen tip 413, or may be pens that have different types of the pen tip 413.

The pen 41 is held by simply inserting it in the pen holder 42 from above. As such, the pen 41 can be easily replaced by opening the cover 23 provided in the case body 2 and, for example, using hands or tweezers to grab a top end portion of the pen shaft portion 411 and lift the pen 41 out.

Thus, a user can realize a wide range of nail designs by appropriately replacing the pen 41 set in the pen holder 42 for a pen 41 having a different color or a different pen tip 413, or using a different type of ink, depending on the nail design desired to be drawn.

The pen holder 42 is provided with a tubular member 421 that is open vertically and into which the pen 41 is inserted, a pen retaining member 422 disposed so as to block an opening on a bottom side of the tubular member 421 (the bottom side in FIG. 3B), and an auxiliary rod member 423 that moves vertically with the pen 41.

A retaining hole 422a that retains the tip side of the pen shaft portion 411 of the pen 41 is formed in the pen retaining member 422.

The pen 41 is retained in the pen holder 42 by the tip side of the pen shaft portion 411 being inserted in the retaining hole 422a of the pen retaining member 422.

Note that screw grooves (not illustrated in the drawings) may be formed in an outer circumferential surface of the tip side of the pen shaft portion 411, screw grooves (not illustrated in the drawings) capable of mating with the screw grooves of the shaft portion may be formed in an inner circumferential surface of the retaining hole 422a, and the pen 41 may be retained in the retaining hole 422a by screwing the screw grooves on the pen shaft portion 411 side into the screw grooves on the retaining hole 422a side.

In the present embodiment, two of the auxiliary rod members 423 are disposed so as to sandwich the pen 41.

A bottom end of each of the auxiliary rod members 423 is mated with the pen retaining member 422 and, thereby, the auxiliary rod members 423 are fixed so as to be parallel with the pen shaft portion 411 of the pen 41.

A retaining protrusion 424 protruding in a direction away from the axial center of the pen 41 is provided on the auxiliary rod members 423.

A coil spring 425 is wrapped around the rod of the auxiliary rod members 423.

The coil spring 425 is configured to apply force in an upward direction to the auxiliary rod member 423 in a state free of outside forces and holds the position of the pen 41 when not drawing at a position where the pen tip 413 does not contact the nail T.

A pen vertical motor 426 constituted by a stepping motor, a gear 428 that engages with a gear 427 attached to a rotating shaft of the pen vertical motor 426, and a plate spring 429 that pivots along with the rotation of the gear 428 are provided in the vicinity of the pen holder 42.

In the present embodiment, a lifting mechanism of the pen 41 is constituted by the pen vertical motor 426, the gear 427, the gear 428, the plate spring 429, and the like.

Here, the plate spring 429 engages with the retaining protrusion 424 provided on the auxiliary rod member 423 and presses the retaining protrusion 424 down, thereby pressing the pen 41 downward.

That is, when the plate spring 429 pivots along with the rotation of the pen vertical motor 426 and the plate spring 429 engages with the retaining protrusion 424 and presses the retaining protrusion 424 downward, the pen 41 is pressed downward against the biasing force of the coil spring 425.

The present embodiment has a configuration in which the pen 41 is not pressed down directly by the plate spring 429; instead, the plate spring 429 presses down on the retaining protrusion 424. Thus, a structure is realized in which the plate spring 429 is not disposed over the pen 41. As a result, the pen 41 can be easily replaced, a height of the lifting mechanism of the pen 41 can be kept comparatively small, and space can be conserved.

Next, a detailed description of the lifting mechanism of the pen 41 is given.

First, when not drawing, the plate spring 429 is in a state where not applying outside pressure to the retaining protrusion 424.

In the state where outside pressure (pressing force by the plate spring 429) is not applied, the pen 41 is pressed up to a position in an upward direction (the upward direction in FIGS. 1A and 3B) by the biasing force of the coil spring 425, and the tip side of the pen 41, that is, the pen tip 413, is separated from the drawing subject surface, namely the surface of the nail T, and held at a height where not contacting the surface.

On the other hand, when drawing, the pen vertical motor 426 rotates a prescribed number of steps and the plate spring 429 presses the retaining protrusion 424 down. Thereby, the pen 41 is pressed down.

The prescribed number of steps when driving the pen vertical motor 426 is appropriately set depending on a height and the like of the nail T of the print finger U1 inserted into the finger receiving portion 31.

That is, in the nail printing apparatus 1 of the present embodiment, nail information (described hereinafter) is acquired in advance. Moreover, the height of the nail T at a contact position where the tip side of the pen 41, namely the pen tip 413, contacts the nail T is confirmed on the basis of the nail information, and the number of steps of the pen vertical motor 426 is determined on the basis of the height.

The pen vertical motor 426 is driven the determined number of steps and the plate spring 429 presses the pen 41 down. Thus, the tip side of the pen 41, namely the pen tip 413 is moved toward to contact the surface of the nail T and an appropriate amount of pen pressure is applied.

Note that when drawing, the height of the nail T changes throughout the drawing. Each time a change occurs, the number of steps of the pen vertical motor 426 is increased or decreased, so that the pen pressure of the pen 41 is adjusted. Thus, drawing is performed while making adjustments to ensure that the pen pressure is roughly constant.

Here, the adjustment to the pen pressure by increasing or decreasing the number of steps of the pen vertical motor 426 is performed each time a change occurs, when the change in the height of the nail T changes a predetermined amount (e.g. 0.5 mm) When the change in the height of the nail T is less than the predetermined amount, no adjustment is made to the pen pressure. However, in these cases, the pen 41 will automatically move vertically due to the plate spring 429 flexibly deforming (elastically deforming) along with the shape of the nail T and, thus, the pen 41 can be made to reliably contact the nail T and, simultaneously, the pen pressure can be maintained at a suitable value.

Note that a spring constant of the plate spring 429 is not that great and is set to a value of a magnitude where pain is not felt by the nail T when the pressing force (outside force) of the plate spring 429 is applied on the nail T.

When drawing, impact due to the vertical movement of the pen 41 is absorbed by the plate spring 429 flexing a suitable degree and the pen 41 moves vertically along with the height of the nail T while maintaining a suitable degree of pen pressure of the pen tip 413 in a roughly constant manner. Thus, the desired nail design can be drawn neatly on the surface of the drawing subject, namely the nail T.

The unit supporting member 44 is fixed to the X-direction movement portion 451 that is attached to the X-direction movement stage 45.

The X-direction movement portion 451 is configured to move in the X direction along guides (not illustrated in the drawings) on the X-direction movement stage 45 via the driving of the X-direction movement motor 46.

Thus, the drawing head 43 that is attached to the unit supporting member 44 moves in the X direction (the X direction in FIG. 1A and the left-right direction of the nail printing apparatus 1).

The X-direction movement stage 45 is fixed to a Y-direction movement portion 471 of the Y-direction movement stage 47.

The Y-direction movement portion 471 is configured to move in the Y direction along guides (not illustrated in the drawings) on the Y-direction movement stage 47 via the driving of the Y-direction movement motor 48.

Thus, the drawing head 43 that is attached to the unit supporting member 44 moves in the Y direction (the Y direction in FIG. 1B and the front-back direction of the nail printing apparatus 1).

Note that in the present embodiment, the X-direction movement stage 45 and the Y-direction movement stage 47 are configured from combinations of the X-direction movement motor 46, the Y-direction movement motor 48, and ball screws and guides (not illustrated in the drawings).

In the present embodiment, a head movement portion 49 is configured as an XY drive unit that drives the drawing head 43 provided with the pen 41 in the X direction and the Y direction via the X-direction movement motor 46, the Y-direction movement motor 48, and the like.

The pen vertical motor 426, the ink jet drawing portion 71, the X-direction movement motor 46, and the Y-direction movement motor 48 of the drawing unit 40 are connected to a drawing control portion 818 of a control device 80 (see FIG. 4), and are configured to be controlled by the drawing control portion 815.

The imaging unit 50 is provided with the imaging device 51 and an illumination device 52.

The imaging unit 50 illuminates the nail T (the print finger U1 including the nail T) which is inserted into the finger receiving portion 31 and is visible through the window 31e, using the illumination device 52.

Moreover, the print finger U1 is imaged using the imaging device 51 and a finger image, namely an image of the print finger U1 (image of a finger including a nail image of the nail T; the subject image) is obtained.

As illustrated in FIGS. 1A and 1B, in the present embodiment, the imaging device 51 and the illumination device 52 are provided in the upper frame 12.

That is, a substrate 13 is set on the upper frame 12.

The imaging device 51 and the illumination device 52 constituting the imaging unit 50 are provided on a bottom surface of the substrate 13 so as to face the dividing wall 116.

Note that the positions where the imaging device 51 and the illumination device 52 are attached to the substrate 13 are not particularly limited to the illustrated example.

The imaging device 51 is, for example, a small image capturing device having a solid state image sensor with a pixel count of about 2 million pixels or greater, a lens, and the like.

In the present embodiment, a first finger image (second subject image) g1 taken of the print finger U1 including the nail T at an initial state before performing the drawing, and a second finger image (first subject image) g2 taken of the print finger U1 including the nail T after the first drawing has been applied on the nail T but before applying the second drawing on the nail T, are acquired by the imaging device 51 of the imaging unit 50.

The imaging device 51 also images the print finger U1 including the nail T immediately after the first drawing has been applied on the nail T and, thereby, acquires a post-drawing finger image.

Moreover, a hereinafter described outline detection portion 812, positioning processing portion 813, and nail outline searching portion 814 use the first finger image g1, the second finger image g2, and the post-drawing finger image to detect the outlines of the print finger U1 and the nail T before the second drawing.

The illumination device 52 is an illumination device having, for example, a white LED or the like as a light source.

In the present embodiment, the illumination device 52 has four light sources, and the light sources are each disposed so as to surround the imaging device 51 on both sides, in front of, and behind the imaging device 51.

Each of the light sources of the illumination device 52 radiates light downward and illuminates an imaging area below the imaging device 51.

Note that the arrangement, number of light sources, and the like that the illumination device 52 has is not limited to the illustrated example.

The imaging unit 50 is connected to an imaging control portion 811 of the hereinafter described control device 80 (see FIG. 4), and is configured to be controlled by the imaging control portion 811.

Note that image data of the images acquired by the imaging unit 50 (that is, the first finger image g1, the second finger image g2, and the post-drawing finger image) is stored in a nail image memory region 821 of a memory unit 82 (described hereinafter).

The control device 80 is, for example, arranged on a substrate 13 or the like disposed in the upper frame 12.

FIG. 4 is a main constituent block diagram showing the control configuration according to the present embodiment.

As illustrated in FIG. 4, the control device 80 is a computer provided with a control unit 81 constituted by a central processing unit (CPU) (not illustrated in the drawings), and a memory unit 82 constituted by a read only memory (ROM), a random access memory (RAM), or the like (neither illustrated in the drawings).

Various programs to operate the nail printing apparatus 1, various data, and the like are stored in the memory unit 82.

Specifically, various programs are stored in the ROM of the memory unit 82 such as, for example, an outline detection program for detecting the outline of the print finger U1 and the outline of the nail T, a positioning processing program for positioning processing, a nail outline searching program for searching for the area of the nail T, a drawing position correction program for correcting drawing positions, a drawing data generation program for generating drawing data, a drawing program for drawing processing, and the like.

These programs are executed by the control device 80 and, thus, the components of the nail printing apparatus 1 are controlled in an integrated manner.

In the present embodiment, the memory unit 82 is provided with the nail image memory region 821 where the finger image of the nail T of the print finger U1 of a user acquired by the imaging unit 50 is stored, a nail information memory region 822 where the nail information detected by the outline detection portion 812 (the outline of the print finger U1, the outline of the nail T, and the like) is stored, and a nail design memory region 823 where image data of a nail design to be drawn on the nail T is stored.

When viewed from a function perspective, the control unit 81 is provided with the imaging control portion 811, the outline detection portion 812, the positioning processing portion 813, the nail outline searching portion 814, a drawing position correction portion 815, a drawing data generation portion 816, a display control portion 817, a drawing control portion 818, and the like.

Functions of the imaging control portion 811, the outline detection portion 812, the positioning processing portion 813, the nail outline searching portion 814, the drawing position correction portion 815, the drawing data generation portion 816, the display control portion 817, the drawing control portion 818, and the like are realized by cooperation of the CPU of the control unit 81 and the programs stored in the ROM of the memory unit 82.

The imaging control portion 811 is configured to cause the imaging device 51 to take finger images of the print finger U1 (images of the print finger U1 including images of the nail T) inserted into the finger receiving portion 31, by controlling the imaging device 51 and the illumination device 52 of the imaging unit 50.

In the present embodiment, the imaging control portion 811 causes the first finger image g1 (see FIG. 6B) taken of the print finger U1 including the nail T at an initial state before applying the drawing by the pen 41 and/or the ink jet drawing portion 71, and the second finger image g2 (see FIG. 6B) taken of the print finger U1 including the nail T after the first drawing has been applied on the nail T but before further applying the second drawing to be acquired.

The imaging device 51 also images the print finger U1 including the nail T immediately after the first drawing has been applied on the nail T and, acquires the post-drawing finger image (not illustrated in the drawings).

The image data of the finger images acquired by the imaging unit 50 are stored in the nail image memory region 821 of the memory unit 82.

Note that in the following, an explanation is given for a case where the outlines of the print finger U1 and the nail T and the like are detected as the nail information, from the finger images (the first finger image g1 and the second finger image g2) acquired by the imaging unit 50. However, the nail information detected from the finger images is not limited thereto and, for example, curvature and the like of the nail T may be additionally detected from the finger images.

The outline detection portion 812 detects a first finger outline (second subject outline) f1 that defines an area of the print finger U1 and a first nail outline n1 that defines an area of the nail T from the image of the print finger U1 including the nail T before drawing, namely, the first finger image g1, acquired by the imaging device 51 of the imaging unit 50.

The outline detection portion 812 detects a second finger outline (first subject outline) f2 that defines an area of the print finger U1 from the second finger image g2 acquired by the imaging device 51 imaging the print finger U1 including the nail T after the first drawing has been applied but before further applying the second drawing.

In the present embodiment, for example, a case is assumed where a base layer (under coat) is applied by the pen 41 as the first drawing and, thereafter, following momentary treatment for drying the ink applied on the nail T in the first drawing, various patterns or the like are drawn by the pen 41 and/or the ink jet drawing portion 71 as the second drawing. As such, mutual displacement may occur between the position of the nail T of the print finger U1 when performing the first drawing and the position of the nail T of the print finger U1 when performing the second drawing.

Note that in the present embodiment, in cases where the drawing on a single nail T is divided into three or more instances, all instances of drawing after the first drawing are referred to as the "second drawing".

Detection methods by the outline detection portion 812 are, for example, as described hereinafter.

First, the detection of the first finger outline f1 and the first nail outline n1 (that is, the detection of the nail T in an initial state before drawing, and the outline of the print finger U1 including the same) by the outline detection portion 812 is performed using AdaBoost (Adaptive Boosting) or a similar learning algorithm.

Specifically, a plurality of samples of typical fingers and nails of people is gathered in advance and stored on the apparatus side during the apparatus production stage. Moreover, the outline detection portion 812 performs matching or the like with these samples when performing the detection of the first finger outline f1 and/or the first nail outline n1. As a result, detection that is comparatively free of noise influence can be performed.

Note that, for example, a post-processing updatable configuration is possible in which the finger and/or the nail T of a user is recognized and these data are used in detection by being added to the samples, or the like. In this case, beneficial effects can be anticipated such as increases in the accuracy of the detection of the first finger outline f1 and the first nail outline n1 by the outline detection portion 812, increases in customizability such that detection will be performed that matches the finger and/or the nail T of the user, and the like.

Note that the technique by which the outline detection portion 812 detects the first finger outline f1 and the first nail outline n1 is not particularly limited. Various techniques other than those described herein can also be used.

Next, the detection of a second finger outline f2 (that is, the outline of the print finger U1 including the nail T after the drawing) by the outline detection portion 812 is performed using, for example, a minimum cut (graph cut) algorithm.

Specifically, in the post-drawing finger image (not illustrated in the drawings) acquired immediately after the first drawing, a color distribution, for an area corresponding to an inside area of the first finger outline f1 detected from the first finger image g1, is acquired as a color sample of the print finger U1, and a color of the finger mount portion 116a, which is the background, is acquired as a sample of the background color.

Moreover, histograms for each color are generated from the colors of both samples, and locations with large changes in color are detected as boundaries between the print finger U1 and the finger mount portion 116a or, in other words, as the second finger outline f2.

Note that the technique by which the outline detection portion 812 detects the second finger outline f2 is not particularly limited. Various techniques other than those described herein can also be used.

The positioning processing portion 813 corrects a position of the first finger outline f1 detected by the outline detection portion 812 and performs positioning processing to bring the position of the first finger outline f1 close to the second finger outline f2.

Here, the first finger outline f1 and the second finger outline f2 are outlines of the same finger. However, mutual displacement of the positions of the nail T of the print finger U1 may occur between the point when the first finger outline f1 is detected and the point when the second finger outline f2 is detected. In this case, the position of the first finger outline f1 and the position of the second finger outline f2 will be mutually displaced. Furthermore, differences in orientations in a rotational direction of the print finger U1 with a length direction as an axis may occur between the point when the first finger outline f1 is detected and the point when the second finger outline f2 is detected. In this case, a shape of the first finger outline f1 and a shape of the second finger outline f2 may not match, even if their mutual positions are adjusted. Consequently, there are cases where the positional deviation of the second finger outline f2 with respect to the first finger outline f1 cannot be obtained with high accuracy through the positioning processing alone.

Thus, in the present embodiment, positioning processing is performed as follows, using the hereinafter described feature part.

Note that as described hereinafter, for example, in cases where good positioning processing using feature part cannot be performed for some reason such as effective feature part not being found or the like, the positioning processing portion 813 is configured to perform the positioning processing on the basis of the first and second finger outlines f1 and f2.

In the positioning processing using feature part, specifically, the positioning processing portion 813 extracts feature part for positioning from each of the first finger image g1 and the second finger image g2. Herein, the "feature part" are, for example, unique shapes of wrinkles, lines, or the like of the skin, spots, moles, or other unique color variations of the skin, or the like.

At this time, the feature part C1 in the first finger image g1 are extracted exclusively from an area corresponding to the area of the finger (that is, the area of the skin, not the area of the nail T).

Figure 5A:
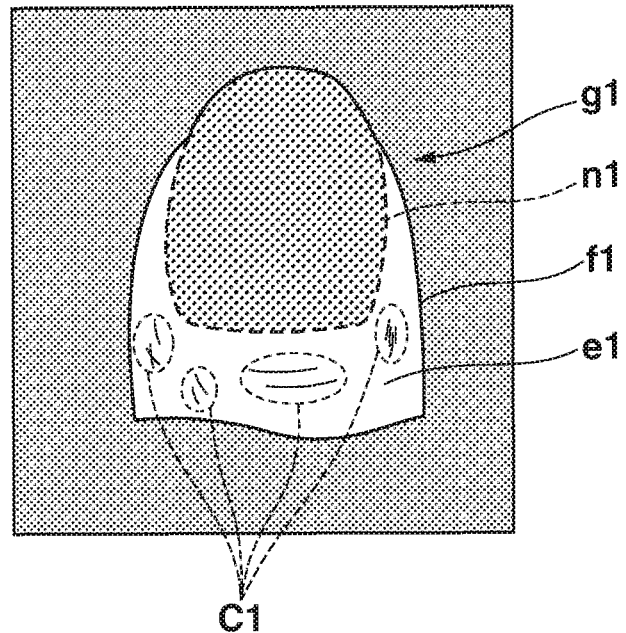
FIG. 5A is a drawing illustrating an extraction subject area of feature part in a first finger image.
Figure 5B:
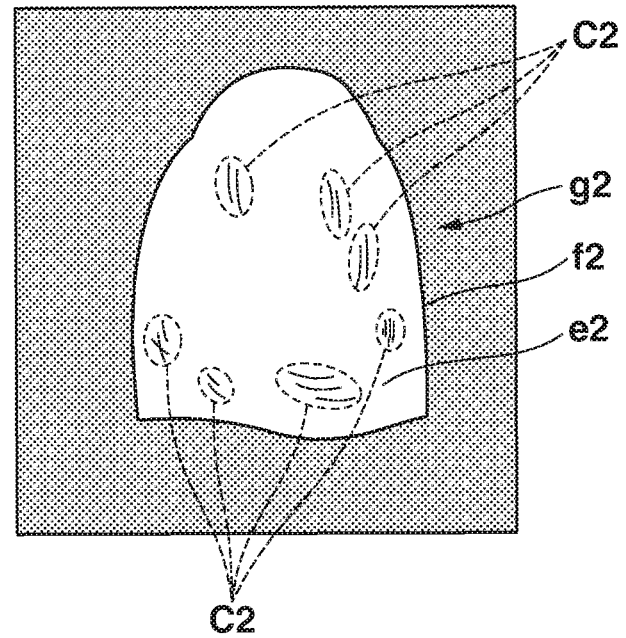
FIG. 5B is a drawing illustrating an extraction subject area of feature part in a second finger image.

FIG. 5A is a drawing illustrating an extraction subject area of the feature part C1 and examples of the feature part C1 in the first finger image g1. FIG. 5B is a drawing illustrating an extraction subject area of the feature part C2 and examples of the feature part C2 in the second finger image g2.

As illustrated in FIG. 5A, the extraction subject area of feature part C1 in the first finger image g1 is an area e1 (white area illustrated in FIG. 5A) defined by the inside area of the outline of the nail T detected as the first nail outline n1 being subtracted from the inside area of the outline of the print finger U1 detected as the first finger outline f1. Note that in FIG. 5A, locations of the first nail outline n1 where the nail T contacts the skin part of the finger are shown using dashed lines, and the feature part C1 are shown surrounded with dotted-lines.

As illustrated in FIG. 5B, the extraction subject area of feature part C2 in the second finger image g2 is an inside area e2 (white area illustrated in FIG. 5B) of the outline of the print finger U1 detected as the second finger outline f2. In FIG. 5B, the feature part C2 are shown surrounded with dotted-lines.

Here, as detection of the nail outline by the outline detection portion 812 is not performed for the second finger image g2, the feature part C2 in the second finger image g2 also include feature part within the nail T area.

However, the feature part of the nail T area are substantially removed when performing the matching with the feature part C1 in the first finger image g1. As a result, there is no impact on later detections.

Upon extraction of the feature part C1 and C2 for the first finger image g1 and the second finger image g2, respectively, the positioning processing portion 813 generates a transformation matrix for positioning using the extracted feature part C1 and C2.

Specifically, the feature part C1 and C2 extracted from the first finger image g1 and the second finger image g2 are matched with each other and a transformation matrix such as that shown in Formula 1 is generated using groups of corresponding feature part.

Formula 1

$$\begin{bmatrix} x' \\ y' \\ 1 \end{bmatrix} = \begin{bmatrix} a & b & c \\ d & e & f \\ 0 & 0 & 1 \end{bmatrix} \begin{bmatrix} x \\ y \\ 1 \end{bmatrix}$$

Formula 1

Note that in the transformation matrix, elements of two-dimensional horizontal movement of the finger, rotation in two dimensions of the finger, and enlarging/shrinking of the finger are included.

Here, the transformation matrix is a similarity transformation matrix and the positioning processing portion 813 performs positioning processing to align the first finger outline f1 with the position of second finger outline f2 using this similarity transformation matrix.

Note that the technique by which the positioning processing portion 813 performs positioning processing is not particularly limited. Various techniques other than those described herein can also be used as the positioning processing.

For example, in cases where the number of matches of the feature part is low or where the transformation matrix cannot be generated, the positioning processing portion 813 may perform the positioning processing using finger area maps based on the first and second finger outlines f1 and f2.

In cases where performing the positioning processing using maps, for example, pattern matching using phase information, namely, a phase only correlation method, or the like is used.

The nail outline searching portion 814 matches the first nail outline n1 to a position of the first finger outline f1 after the positioning processing by the positioning processing portion 813, and transforms the coordinates of the first nail outline n1. The nail outline searching portion 814 then performs searching for the second nail outline n2, corresponding to the first nail outline n1 after the coordinate transforming, from within the second finger image g2.

Note that the technique by which the nail outline searching portion 814 transforms the coordinates of the first nail outline n1 is not particularly limited.

For example, in cases where there is a transformation matrix created by the positioning processing portion 813 (see Formula 1, above), the coordinates of the nail outline, corresponding to the first finger outline f1 after the positioning processing, are obtained by transforming the coordinates of the first nail outline n1 using this transformation matrix.

Here, it is thought that the first nail outline n1 after the coordinate transforming will roughly match the nail outline n2 of the nail T included in the second finger image g2.

Figure 6A:
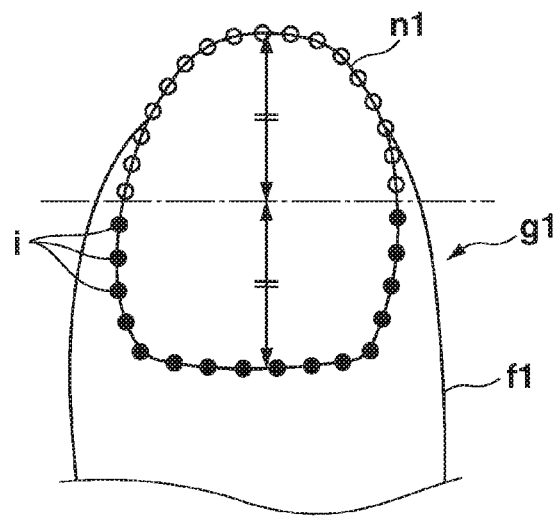
FIGS. 6A and 6B are explanatory drawings illustrating an order of drawing processing according to the embodiment of the present invention.

Next, the nail outline searching portion 814 divides the area of the nail T (that is, the inside area of the first nail outline n1 after the coordinate transforming) into an upper area (area on a nail free edge side) and a lower area (area on a nail root side) in an extending direction of the nail T (the longitudinal direction in FIG. 6A).

FIG. 6A is an explanatory drawing illustrating an example of a location of a divider of the area of the nail T.

In the present embodiment, as illustrated in FIG. 6A, an example is given in which the area of the nail T is divided at a middle portion between an upper edge portion of the nail T (that is, of the coordinates of the nail outline, the portion most to the free edge side of the nail) and a lower edge portion of the nail T (that is, of the coordinates of the nail outline, the portion most to the root side of the nail).

For the lower area of the nail T, the nail outline searching portion 814 searches for the second nail outline n2 by performing template matching, using the texture of the skin area of the finger, for a boundary portion with the first nail outline n1 after the coordinate transforming in the first finger image g1 after the positioning processing by the positioning processing portion 813.

Figure 6B:
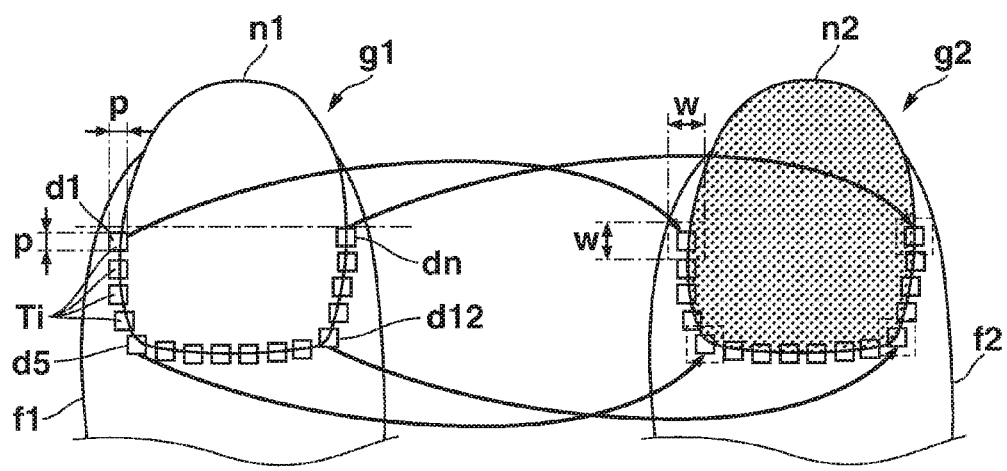

FIG. 6B is an explanatory drawing schematically illustrating an image of the template matching by the nail outline searching portion 814.

In the template matching by the nail outline searching portion 814, in a brightness image of the first finger image g1 after the positioning processing, coordinates of points i (illustrated in FIG. 6A as black circles), from among the points constituting the first nail outline n1, belonging to the lower area of the nail T are (x1, y1) to (xn, yn).

Moreover, as illustrated in FIG. 6B, the texture of skin areas d1 to dn (the areas in FIG. 6B defined by solid line squares) of the finger, the areas d1 to dn having a size of p×p surrounding each of the points i, is a template Ti.

Additionally, in the brightness image of the second finger image g2, the nail outline searching portion 814 searches for the point closest to the point i in w×w areas (the areas in FIG. 6B defined by dashed line squares) around the (x1, y1) to (xn, yn) coordinates.

Note that in the first finger image g1 after the positioning processing, the points constituting the first nail outline n1 are set to, for example, about 100 points throughout the entire periphery of the nail T.

Moreover, the points i (illustrated in FIG. 6A as black circles) positioned in the lower area of the nail T constitute roughly ½ of these points or, for example, about 50 points.

Additionally, the size of each of the p×p areas and the w×w areas is not particularly limited and is appropriately set depending on the size of the image and similar factors.

The w×w areas are preferably of a size about two times the size of the p×p areas.

On the other hand, for the upper area of the nail T, the area of the skin of the finger is typically comparatively less than that of the lower area. As such, it is difficult to perform the template matching described previously. Thus, for the upper area of the nail T, the nail outline searching portion 814 searches for the second nail outline n2 by detecting an edge of the nail T against the background.

Here, "the background" refers to the finger mount portion 116a imaged in the second finger image g2 along with the print finger U1 including the nail T.

As described previously, the finger mount portion 116a is formed from a black member or a member having an inverted color of a skin color in order to increase the contrast with the print finger U1 including the nail T.

By examining the differences in color and the differences in brightness between the finger mount portion 116a and the nail T, the nail outline searching portion 814 searches for places where edge strength is highest among a range of a direction normal to the outline at points (illustrated by white circles in FIG. 6A) belonging to the upper area of the nail T among the points constituting the first nail outline n1 in the first finger image g1 after the positioning processing.

Thereby, the nail outline searching portion 814 detects the edge of the nail T and creates an edge image.

Note that in cases where the nail T is short and the nail T is located inward of the tip portion of the finger, the skin area of the finger becomes the "background". In this case, the nail outline searching portion 814 detects the edge of the nail T against the skin area of the finger.

Furthermore, the nail outline searching portion 814 performs smoothing processing through various techniques along the outlines of the lower area of the nail T and the upper area of the nail T that have been found in the searching.

The technique by which the smoothing processing is performed is not particularly limited. Examples of techniques that can be used for performing the smoothing processing include Snakes (Active Contour Model) and the like.

Snakes is a technique based on the energy minimization principle and outlines obtained using this technique are such that the energy function is minimized, as that illustrated in Formula 2.

Note that in Formula 2, $E_{cont,i}$ is a term related to a distance between adjacent outline points, $E_{curv,i}$ is a term related to curvature, and $E_{image,i}$ is a term related to the edge strength.

Formula 2

$$E_i = \alpha E_{cont,i} + \beta E_{curv,i} + \gamma E_{image,i} \quad \text{Formula 2}$$

The drawing position correction portion 815 calculates a correction value for correcting a drawing position at the time of the second drawing on the basis of an amount of mutual deviation between the first nail outline n1 and the second nail outline n2 found by the nail outline searching portion 814.

The correction value calculated by the drawing position correction portion 815 is sent to the drawing data generation portion 816 and the drawing data generation portion 816 performs correction of the image data using the correction value.

The drawing data generation portion 816 generates data, for the drawing to be applied by the drawing head 43 on the nail T of the print finger U1, on the basis of the outline of the nail T detected by the outline detection portion 812 and the nail outline searching portion 814.

The drawing data generation portion 816 calibrates the image data of the nail design to the shape of the nail T depending on the outline of the nail T and performs appropriate curvature correction and the like.

Furthermore, in cases where a correction value for the drawing position is calculated by the drawing position correction portion 815, this correction value is also applied to the image data.

As a result, drawing data for the nail design to be drawn by the pen 41 or the ink jet drawing portion 71 is generated.

The display control portion 817 is configured to cause the display unit 26 to display various display screens by controlling the display unit 26.

In the present embodiment, examples of the various display screens the display control portion 817 is configured to display on the display unit 26 include nail design selection screens and thumbnail images for confirming designs, finger images acquired by imaging the print finger U1, various command screens, operation screens, and the like.

The drawing control portion 818 is configured to output control signals to the drawing unit 40 on the basis of the drawing data generated by the drawing data generation portion 816, and control the X-direction movement motor 46, the Y-direction movement motor 48, and the pen vertical motor 426 of the drawing unit 40, the ink jet drawing portion 71, and the like so as to apply a drawing corresponding to the drawing data on the nail T.

Specifically, the drawing control portion 818 controls the pen vertical motor 426 when the pen 41 is not drawing so as to maintain a state where the retaining protrusion 424 is not pressed down by the plate spring 429.

When the pen 41 is drawing, the drawing control portion 818 causes the pen vertical motor 426 to operate and controls the operation of the pen vertical motor 426 so that the retaining protrusion 424 is pressed down by the plate spring 429 and the tip side (the pen tip 413) of the pen 41 comes into contact with the surface of the nail T.

Note that at locations where the height of the nail T changes greatly and cannot be handled by the flexible deformation (elastic deformation) of the plate spring 429 alone, the drawing control portion 818 preferably causes the number of steps of the pen vertical motor 426 to be increased or decreased, thus adjusting the pen pressure of the pen 41 so that the pen pressure becomes roughly constant.

Next, a drawing method by the nail printing apparatus 1 according to the present embodiment is described while referencing FIGS. 7 to 9C.

Figure 7:
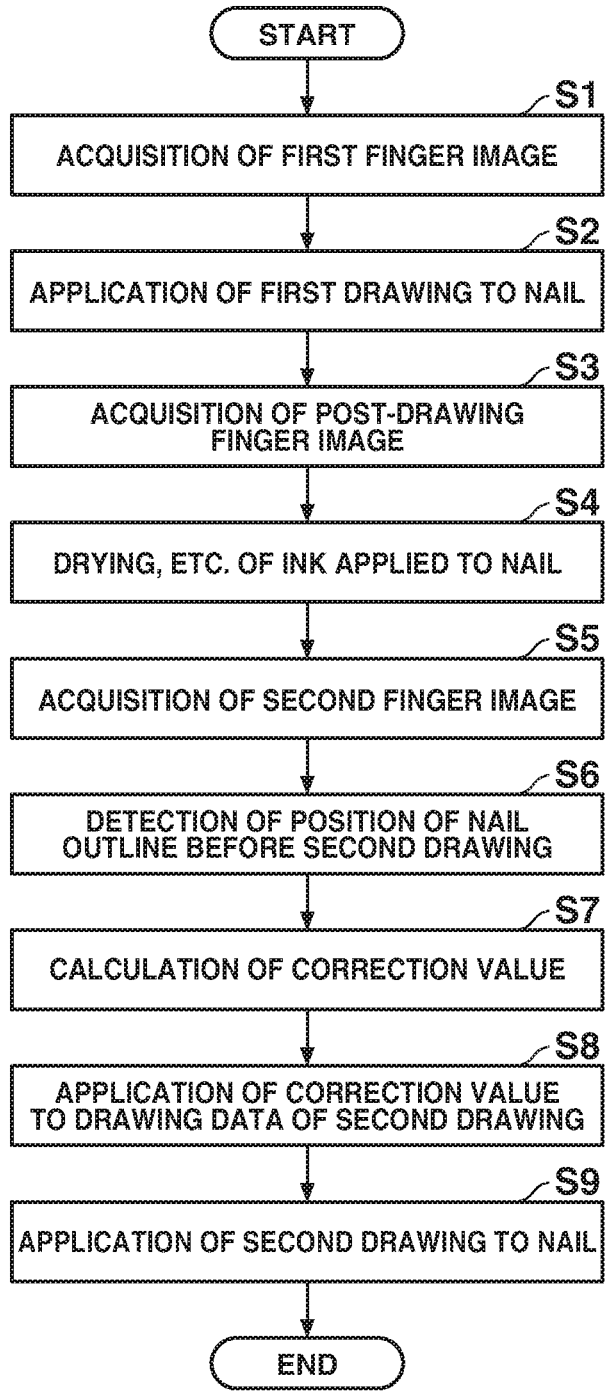
FIG. 7 is a flowchart showing a summary of the drawing processing according to the embodiment of the present invention.

FIG. 7 is a flowchart showing a summary of drawing processing by the nail printing apparatus 1 of the present embodiment.

Figure 8:
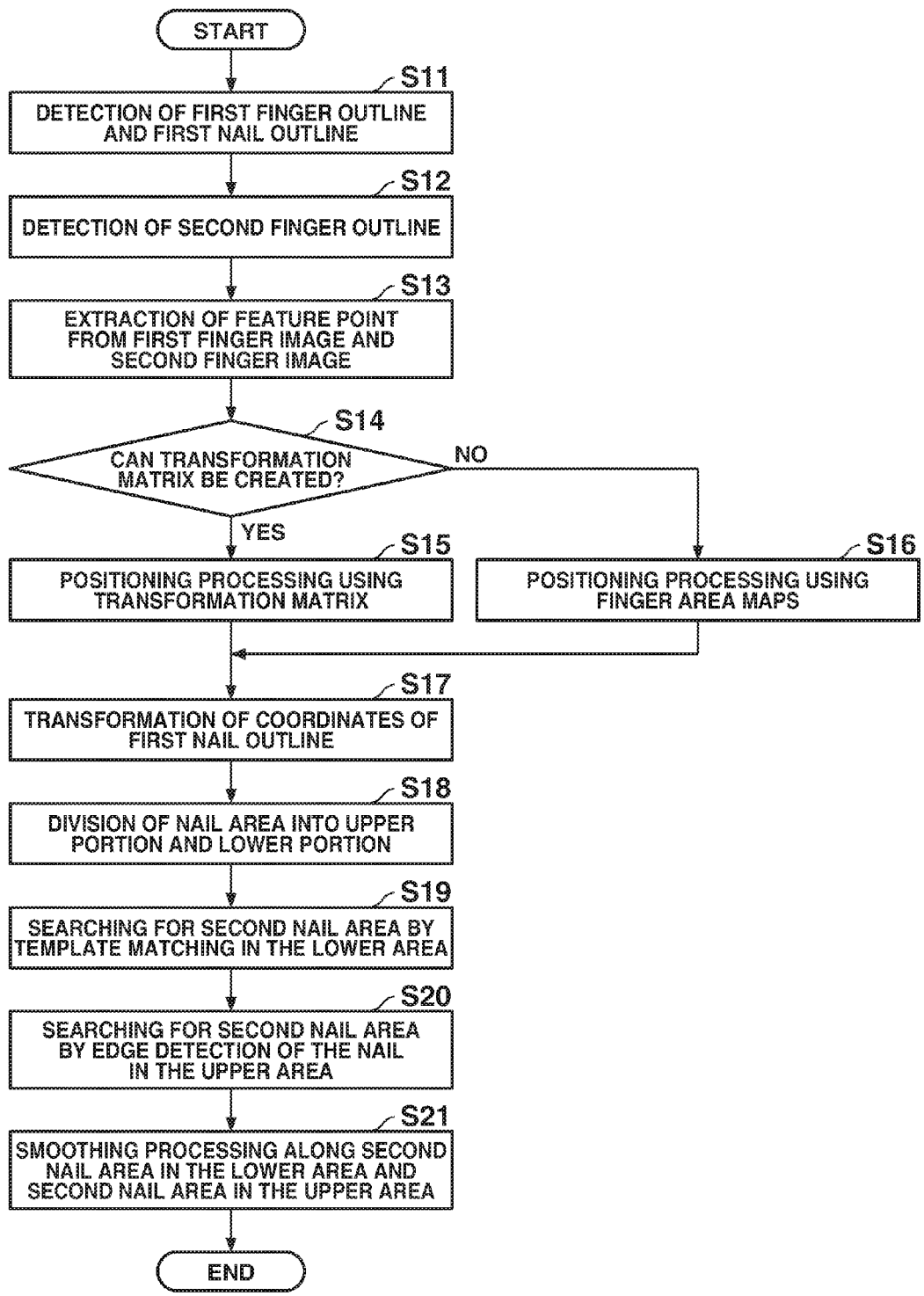
FIG. 8 is a flowchart showing detection processing of nail outlines according to the embodiment of the present invention.

FIG. 8 is a flowchart showing detection processing of the nail outlines of the present embodiment.

Figure 9A:
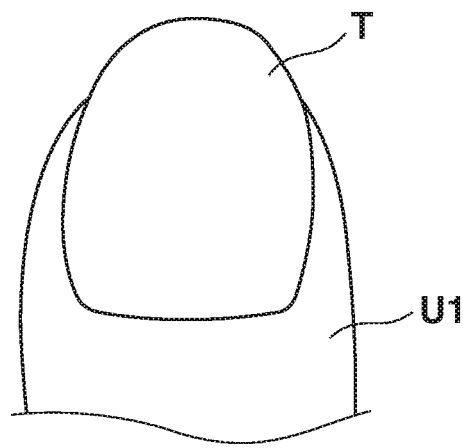
FIG. 9A is a plan view of a print finger including a nail in an initial state before drawing.
Figure 9B:
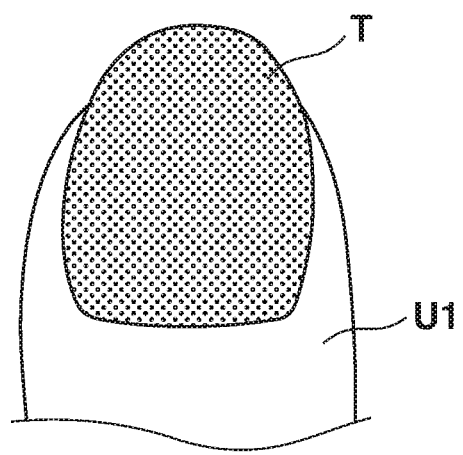
FIG. 9B is a plan view of the print finger including the nail after a first drawing but before a second drawing.
Figure 9C:
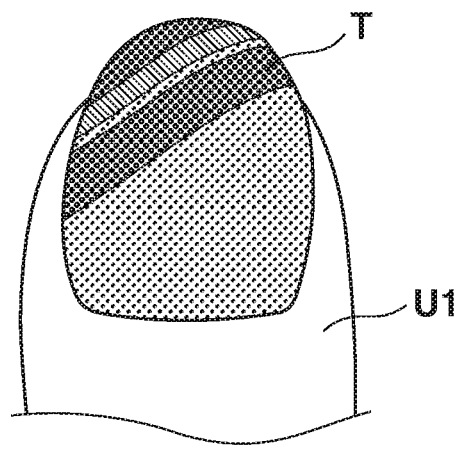
FIG. 9C is a plan view of the print finger including the nail after the second drawing.

FIG. 9A is a plan view of the print finger U1 including the nail T in an initial state before drawing. FIG. 9B is a plan view of the print finger U1 including the nail T after the first drawing but before the second drawing. FIG. 9C is a plan view of the print finger U1 including the nail T after the second drawing.

In cases where performing drawing using the nail printing apparatus 1, a user first operates a power switch to turn on the control device 80.

Upon selection of the nail design to be drawn on the nail T and setting of the print finger U1 in the finger receiving portion 31, as shown in FIG. 7, before starting the drawing operation, the imaging control portion 811 first controls the imaging unit 50 and causes the imaging device 51 to image the print finger U1 while illuminating the print finger U1 with the illumination device 52.

As a result, as illustrated in FIG. 9A, the imaging control portion 811 acquires the first finger image g1 of the print finger U1 in an initial state before drawing on the nail T (step S1).

Thereafter, the drawing control portion 818 causes the drawing portion 40 to operate and perform the first drawing (step S2). As a result, for example, as illustrated in FIG. 9B, a state is reached where ink is applied to an entirety of the nail T.

Immediately after performing the first drawing, the imaging control portion 811 causes the imaging device 51 to operate and image the print finger U1.

As a result, the imaging control portion 811 acquires a post-drawing finger image, in which the first drawing has been applied on the nail T (step S3).

Thereafter, drying or the like of the ink applied on the nail T is performed (step S4).

Moreover, before performing the second drawing, the imaging control portion 811 causes the imaging device 51 to operate and image the print finger U1 again.

As a result, the imaging control portion 811 acquires an image of the print finger U1 on which the first drawing has been applied on the nail T and before the second drawing is applied, namely, the second finger image g2 (step S5).

Upon acquisition of the second finger image g2, before beginning the second drawing, position detection of the nail outline of the nail T (the second nail outline n2) at the present time, that is, immediately before beginning the second drawing, is performed (step S6).

Here, the position detection of the nail outline of the nail T before beginning the second drawing (step S6) is described in detail while referencing FIG. 8.

As shown in FIG. 8, the outline detection portion 812 detects the first finger outline f1 and the first nail outline n1 from an image of the print finger U1 including the nail T before drawing, namely, the first finger image g1 (step S11).

Next, the outline detection portion 812 detects the second finger outline f2 from the second finger image g2 (step S12).

Next, the positioning processing portion 813 extracts the feature part C1 and C2 for positioning the first finger image g1 and the second finger image g2 from the first finger image g1 and the second finger image g2, respectively (step S13).

After extracting the feature part C1 and C2 for the first finger image g1 and the second finger image g2, respectively, the positioning processing portion 813 attempts the generation of a transformation matrix for positioning using the extracted feature part C1 and C2.

Moreover, the positioning processing portion 813 determines whether or not the transformation matrix can be generated (step S14).

In cases where the transformation matrix can be generated (YES in step S14), the positioning processing portion 813 performs positioning processing in which the first finger outline f1 is aligned with the position of the second finger outline f2 using the transformation matrix (step S15).

In cases where the transformation matrix cannot be generated (NO in step S14), the positioning processing portion 813 performs positioning processing in which the first finger outline f1 is aligned with the position of the second finger outline f2 using finger area maps based on the first and second finger outlines f1 and f2 (step S16).

Upon completion of the positioning processing by the positioning processing portion 813, the nail outline searching portion 814 matches the first nail outline n1 to a position of the first finger outline f1 after the positioning processing and transforms the coordinates of the first nail outline n1 (step S17).

Next, the nail outline searching portion 814 divides the area of the nail T (that is, the inside area of the first nail outline n1 after the coordinate transforming) into an upper portion (nail free edge side) and a lower portion (nail root side) in an extending direction of the nail (step S18).

Moreover, for the lower area of the nail T, the nail outline searching portion 814 searches for the second nail outline n2 by performing template matching on the boundary portion with the first nail outline n1 after the coordinate transforming, in the first finger image g1 after the positioning processing (step S19).

For the upper area of the nail T, the nail outline searching portion 814 searches for the second nail outline n2 by detecting an edge of the nail T against the background (step S20).

Upon the finding of the second nail outline n2 for each of the upper area of the nail T and the lower area of the nail T, the nail outline searching portion 814 further performs smoothing processing along the second nail outline n2 of the lower area of the nail T and the upper area of the nail T (step S21).

As a result, the position of the nail T immediately before performing the second drawing (that is, the position of the second nail outline n2) is detected.

Next, in cases where there is mutual deviation between the position of the nail T in the initial state before the performing of the drawing (that is, the position of the first nail outline n1) and the position of the nail T immediately before the performing of the second drawing (that is, the position of the second nail outline n2), the drawing position correction portion 815 calculates the correction value for correcting the drawing position (step S7).

The correction value calculated by the drawing position correction portion 815 is applied to the drawing data for the second drawing in the drawing data generation portion 816 (step S8).

Thereafter, the drawing control portion 818 causes the drawing portion 40 to operate and perform the second drawing on the basis of the drawing data after the drawing position correcting.

As a result, a pattern such as that illustrated in FIG. 9C is drawn on the nail T in a manner free of positional deviation (step S9).

As described above, according to the present embodiment, the first finger image g1 is acquired before drawing; the second finger image g2 is acquired after the first drawing but before applying the second drawing; the first finger outline f1 and the first nail outline n1 are detected from the first finger image g1; and the second finger outline f2 is detected from the second finger image g2.

Then, positioning processing is performed for aligning the first finger outline f1 with the position of the second finger outline f2; the first nail outline n1 is matched with a position of the first finger outline f1 after the positioning processing and the coordinates of the first nail outline n1 are transformed; and searching is performed for the second nail outline n2 corresponding to the first nail outline n1 after the coordinate transforming from within the second finger image g2.

Thus, the presence of positional deviation of the nail outline of the nail T before the second or subsequent drawings is determined in cases where the application of a drawing on the nail T is divided into a plurality of instances. As such, even in cases where the position of the nail T has moved in the period up to the performing of the subsequent drawing, deviation of the drawing position can be prevented and drawing of high quality can be performed.

Moreover, when detecting the second nail outline n2 before the second drawing, first the approximate position of the nail T is detected from the outline of the finger and, thereafter, precise searching for the outline of the nail T is performed.

As a result, the position of the nail T can be detected more efficiently than in cases where searching only for the outline of the nail T.

Upon application of the drawing, the color and the brightness of the nail T change from that of the initial state of the nail T before drawing. Therefore, it is difficult to detect the outline after the first drawing by a simple comparison between the nail T before the first drawing and the nail T after the first drawing.

On this point, in the present embodiment, for the lower area of the nail T that at least contacts the skin area of the finger, the outline of the nail T is found by matching the texture of the skin area of the finger adjacent to the nail T.

As described, even if the color or brightness of the nail T changes due to the nail T being drawn on, the position of the nail T can be accurately found by searching for the outline of the nail T via the areas that do not change before and after the drawing.

Moreover, because the appropriate correction of the drawing position is performed on the basis of the outline of the nail T obtained in this manner, even in cases where the application of a drawing on the nail T is divided into a plurality of instances, drawing of high quality that is free of drawing position deviation can be performed.

The embodiment described above is for the purpose of elucidating the present invention and is not to be construed as limiting the present invention. The invention can of course be altered and improved without departing from the gist thereof.

For example, in the present embodiment, an example has been given in which, when the nail outline searching portion 814 divides the nail area, the location of the divider is a middle portion between the upper edge portion of the nail T and the lower edge portion of the nail T. However, the location of the divider of the nail area is not limited thereto.

Due to the fact that highly accurate template matching is performed for the lower area of the nail T, the accuracy of the matching will improve with the expansion of the area categorized as the lower area. As such, a configuration is possible in which the lower area is configured to be more expansive than the upper area such as, for example, a ratio of 4:6 (upper area to lower area of the nail T), or the like.

The template matching performed for the lower area is performed on the skin area adjacent to the nail T. As such, in cases where, for example, the nail T is short and most of the outer periphery of the nail T is surrounded by the skin area, the template matching can be performed over an expansive range as most of the nail area will be categorized as the lower area; and in cases where, for example, the nail T is long and only a small area of the lower portion of the nail T is surrounded by the skin area, the template matching cannot be performed on the portion that is not surrounded by the skin area. Therefore, a configuration is possible in which the location of the divider of the nail area is appropriately changed depending on the shape of the finger and/or nail of the user such that most of the nail area is categorized as the upper area.

With such a configuration, searching for the nail outline more suited to the nail of the user can be performed.

In the present embodiment, an example has been given of a case where the drawing head 43 is provided with one pen holder 42. However, the number of the pen holders 42 provided in the drawing head 43 is not limited to one. For example, a configuration is possible in which two or more pen holders 42 are provided and two or more pens 41 for drawing are held.

In the present embodiment, an example has been given of a case where a user manually replaces the pen 41 held by the pen holder 42 as necessary. However, a configuration is possible in which a waiting space is provided where the pens 41 stand by in a home area 60 or the like, and the required pen 41 is automatically acquired from the waiting space and inserted into the pen holder 42 by a pen replacing mechanism (not illustrated in the drawings).

In the present embodiment, an example has been given of a case where the imaging device 51 and the illumination device 52 are fixedly disposed to a ceiling portion or the like of the nail printing apparatus 1. However, the location where the imaging device 51 and the illumination device 52 are provided is not limited thereto.

For example, a configuration is possible in which the imaging device 51 and the illumination device 52 are mounted on the drawing head 43, and the imaging device 51 and the illumination device 52 are moved integrally with the drawing head 43 by the head movement portion 49.

In this case, for example, the nail T can be imaged from a plurality of mutually different directions, the curvature and the like of the nail T can be accurately acquired, and highly accurate curvature correction can be performed.

Note that in cases where the imaging unit 50 is configured as described above, the first finger image g1, the second finger image g2, and the post-drawing finger image are all preferably imaged from the same position and the same direction.

In the present embodiment, an example has been given of the nail printing apparatus 1 in which fingers are inserted into the apparatus one finger at a time and drawing is performed sequentially. However, the present invention can also be applied to an apparatus in which consecutive drawing and/or removal of ink can be performed on a plurality of fingers, without the need to insert and remove each finger.

For example, by broadening the operating range of the pens so as to enlarge the drawable area, drawings can be applied consecutively on the nail of each finger in a state where a plurality of the print fingers U1 is simultaneously inserted.

The embodiments described above are not to be construed as limiting the scope of the present invention and include the scope of the invention recited in the claims and equivalents.

The invention claimed is:

1. A drawing apparatus comprising:
 a drawing unit which applies a drawing on a nail of a subject which is a finger or a toe; and
 a control unit which controls operation of the drawing unit; wherein
 the control unit:
 (1) extracts a first feature part in a first area which is inside area of a first subject outline of the subject in a first subject image acquired by imaging the subject after a first drawing has been applied on the nail,
 (2) acquires a position of the nail in the first subject image on the basis of the first feature part and a second feature part which is extracted in a second area which is inside area of a second subject outline of a second subject image except an area of the nail, the second subject image is acquired by imaging the subject which the drawing has not been applied; and
 (3) controls a drawing position of the drawing unit when the drawing unit applies a second drawing on the nail after the first subject image is acquired, on the basis of the position of the nail in the first subject image.

2. The drawing apparatus according to claim 1, wherein:
 the control unit:
 acquires the second subject image by imaging the subject on which the drawing has not been applied,
 acquires the second area which is subtracted an area of the nail from an area which is inside area of the subject in the second subject image; and
 extracts the second feature part in the second area.

3. The drawing apparatus according to claim 1, wherein:
 the drawing unit performs the drawing by applying an ink on the nail; and
 the control unit acquires the first subject image after the first drawing has been applied on the nail and drying treatment for drying the ink that has been applied on the nail in the first drawing has been performed, and before the second drawing is applied.

4. The drawing apparatus according to claim 1, wherein:
 the control unit comprises a positioning processing portion which corrects a position of the second subject outline on the basis of the first feature part and the second feature part, and performs positioning processing to bring the position of the second subject outline close to a position of the first subject outline; and
 the control unit acquires the position of the nail in the first subject image on the basis of results of the positioning processing by the positioning processing portion.

5. The drawing apparatus according to claim 4, wherein:
 the control unit comprises an outline detection portion which detects the second subject outline and a first nail outline defining an area of the nail from the second subject image; and
 the control unit extracts the second area in the second subject image on the basis of the second subject outline and the first nail outline.

6. The drawing apparatus according to claim 5, wherein:
 the control unit:
 comprises a nail outline searching portion which corrects a position of the first nail outline by matching the position of the first nail outline to the correction of the position of the second subject outline by the positioning processing portion; and searches for a position of a second nail outline defining an outline of the nail in the first subject image, on the basis of the position of the first nail outline after the correcting.

7. The drawing apparatus according to claim 6, wherein:
 the nail outline searching portion:
 divides an area of the nail in the first subject image into an upper area of a free edge side of the nail and a lower area of a root side of the nail in an extending direction of the nail;
 for the lower area, searches for the second nail outline in the second subject image by performing template matching based on a texture of an area of a boundary area with the first nail outline, excluding an inside area of the first nail outline; and
 for the upper area, searches for the second nail outline in the first subject image by detecting an edge between the area of the nail and an area constituting a background of the nail.

8. The drawing apparatus according to claim 6, wherein:
 the control unit comprises a drawing position correction portion which calculates a correction value for correcting the drawing position when the drawing unit applies the second drawing on the nail, on the basis of the position of the second nail outline detected by the nail outline searching portion.

9. A drawing method for a drawing apparatus,
 the drawing apparatus comprising:
 a drawing unit which applies a drawing on a nail of a subject which is a finger or a toe;
 the drawing method comprising the steps of:
 extracting a first feature part in a first area which is inside area of a first subject outline of the subject in a first subject image acquired by imaging the subject after a first drawing has been applied on the nail;
 acquiring a position of the nail in the first subject image on the basis of the first feature part and a second feature part which is extracted in a second area which is inside area of a second subject outline of a second subject image except an area of the nail, the second subject image is acquired by imaging the subject which the drawing has not been applied; and controlling a drawing position of the drawing unit, when the drawing unit applies a second drawing on the nail after the first subject image is acquired, on the basis of the position of the nail in the first subject image.

10. The drawing method for a drawing apparatus according to claim 9, wherein:

the drawing unit performs the drawing by applying an ink on the nail; and the method comprises a step of drying the ink that has been applied on the nail; and the step of acquiring the first subject image is executed after the first drawing has been applied on the nail and the step of drying the ink that has been applied on the nail in the first drawing has been performed, and before the second drawing is applied.

11. The drawing method for a drawing apparatus according to claim 9, wherein:

the method comprises a step of correcting a position of the second subject outline on the basis of the first feature part and the second feature part, and performing positioning processing to bring the position of the second subject outline close to a position of the first subject outline; and the step of acquiring the position of the nail in the first subject image comprises a step of acquiring the position of the nail in the first subject image on the basis of results of the positioning processing.

12. The drawing method for a drawing apparatus according to claim 11, the method further comprising the steps of:

detecting the second subject outline and a first nail outline defining an area of the nail from the second subject image; and extracting the second area in the second subject image on the basis of the second subject outline and the first nail outline.

13. The drawing method for a drawing apparatus according to claim 12, the method further comprising the steps of:

correcting a position of the first nail outline by matching the position of the first nail outline to the correction of the position of the second subject outline by the positioning processing; and searching for a position of a second nail outline defining an outline of the nail in the first subject image, on the basis of the position of the first nail outline after the correcting.

14. The drawing method for a drawing apparatus according to claim 13, wherein:

the step of searching for the second nail outline comprises the steps of:

dividing an area of the nail in the first subject image into an upper area of a free edge side of the nail and a lower area of a root side of the nail in an extending direction of the nail;

searching for the second nail outline in the second subject image, in the lower area, by performing template matching based on a texture of an area of a boundary area with the first nail outline, excluding an inside area of the first nail outline; and searching for the second nail outline in the first subject image, in the upper area, by detecting an edge between the area of the nail and an area constituting a background of the nail.

15. The drawing method for a drawing apparatus according to claim 13, the method further comprising the step of:

calculating a correction value for correcting the drawing position when the drawing unit applies the second drawing on the nail, on the basis of the position of the second nail outline detected in the step of searching for the position of the second nail outline.

* * * * *